US007502019B2

(12) United States Patent
Shin

(10) Patent No.: US 7,502,019 B2
(45) Date of Patent: Mar. 10, 2009

(54) LIGHT EMITTING DISPLAY DEVICE USING DEMULTIPLEXER

(75) Inventor: Dong-Yong Shin, Suwon-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 909 days.

(21) Appl. No.: 10/987,410

(22) Filed: Nov. 12, 2004

(65) Prior Publication Data

US 2005/0117410 A1 Jun. 2, 2005

(30) Foreign Application Priority Data

Nov. 27, 2003 (KR) ...................... 10-2003-0085076

(51) Int. Cl.
*G09G 3/36* (2006.01)
*G06F 3/038* (2006.01)

(52) U.S. Cl. .......................... 345/211; 345/98; 345/206

(58) Field of Classification Search ........... 345/55–100, 345/204–214
See application file for complete search history.

(56) References Cited

U.S. PATENT DOCUMENTS

| | | | | |
|---|---|---|---|---|
| 4,963,860 A * | 10/1990 | Stewart | ...................... | 345/206 |
| 5,510,807 A * | 4/1996 | Lee et al. | .................... | 345/208 |
| 6,229,506 B1 | 5/2001 | Dawson et al. | | |
| 6,281,891 B1 * | 8/2001 | DaCosta et al. | ............. | 345/206 |
| 6,924,786 B2 * | 8/2005 | Hebiguchi | ................... | 345/98 |
| 7,193,619 B2 | 3/2007 | Kimura | | |
| 2002/0033718 A1 | 3/2002 | Tam | | |
| 2003/0201955 A1 | 10/2003 | Song et al. | | |
| 2004/0017341 A1 * | 1/2004 | Maki | ........................... | 345/87 |

FOREIGN PATENT DOCUMENTS

| | | |
|---|---|---|
| JP | 2-124624 | 5/1990 |
| JP | 3-89546 | 4/1991 |
| JP | 3-109766 | 5/1991 |
| JP | 2002-40961 | 2/2002 |
| JP | 2002-108252 | 4/2002 |
| JP | 2003-177680 | 6/2003 |
| JP | 2003-186438 | 7/2003 |
| JP | 2003-195815 | 7/2003 |
| JP | 2003-202836 | 7/2003 |
| JP | 2003-280590 | 10/2003 |

(Continued)

OTHER PUBLICATIONS

Patent Abstracts of Japan for publication No. 2003-195815, dated Jul. 9, 2003, in the name of Akira Yumoto.

(Continued)

*Primary Examiner*—David L Lewis
(74) *Attorney, Agent, or Firm*—Christie, Parker & Hale, LLP

(57) ABSTRACT

In a display device using a demultiplexer, two power cables for transmitting external power supply voltages to a display device are formed on the top and the bottom of a substrate, and are coupled to both ends of vertical lines for transmitting power supply voltages to pixels in the display area. Power supply points are respectively formed on both ends of the two power cables and receive external power supply voltages. Accordingly, voltage dropping generated in the vertical lines and the power cables is reduced.

29 Claims, 12 Drawing Sheets

FOREIGN PATENT DOCUMENTS

| | | | |
|---|---|---|---|
| JP | 2003-330386 | | 11/2003 |
| JP | 2004-38176 | | 2/2004 |
| JP | 2004-206055 | | 7/2004 |
| JP | 2004-226543 | | 8/2004 |
| JP | 2005-25176 | | 1/2005 |
| JP | 2005-31651 | | 2/2005 |
| KR | 2000-0074551 | | 12/2000 |
| KR | 2003-0094043 | | 12/2003 |
| WO | WO 03/038796 | A1 | 5/2003 |

OTHER PUBLICATIONS

Patent Abstracts of Japan, Publication No. 2002-040961; Date of Publication: Feb. 8, 2002; in the name of Yoshiharu Hashimoto.

Patent Abstracts of Japan, Publication No. 2002-108252; Date of Publication: Apr. 10, 2002; in the name of Naoaki Furumiya.

Patent Abstracts of Japan, Publication No. 2003-177680; Date of Publication: Jun. 27, 2003; in the name of Hiroshi Tsuchiya, et al.

Patent Abstracts of Japan, Publication No. 2003-202836; Date of Publication: Jul. 18, 2003; in the name of Shinichi Ishizuka, et al.

Patent Abstracts of Japan, Publication No. 2003-330386; Date of Publication: Nov. 19, 2003; in the name of Hajime Akimoto, et al.

Patent Abstracts of Japan, Publication No. 2004-038176; Date of Publication: Feb. 5, 2004; in the name of Beom-Rak Choi, et al.

Patent Abstracts of Japan, Publication No. 2004-206055; Date of Publication: Jul. 22, 2004; in the name of Hiroshi Hirayama.

Patent Abstracts of Japan, Publication No. 2004-226543; Date of Publication: Aug. 12, 2004; in the name of Ichiro Shiraki, et al.

Patent Abstracts of Japan, Publication No. 2005-025176; Date of Publication: Jan. 27, 2005; in the name of Yoshifumi Tanada.

Patent Abstracts of Japan, Publication No. 2005-031651; Date of Publication: Feb. 3, 2005; in the name of Shunpei Yamazaki, et al.

Korean Patent Abstracts, Publication No. 1020000074551 A; Date of Publication: Dec. 15, 2000; in the name of Yong Min Ha et al.

Korean Patent Abstracts, Publication No. 1020030094043 A; Date of Publication: Dec. 11, 2003; in the name of Yoshiharu Nakajima et al.

* cited by examiner

LIGHT EMITTING DISPLAY DEVICE USING DEMULTIPLEXER

CROSS REFERENCE TO RELATED APPLICATION

This application claims priority to and the benefit of Korea Patent Application No. 10-2003-0085076 filed on Nov. 27, 2003 in the Korean Intellectual Property Office, the entire content of which is incorporated herein by reference.

BACKGROUND OF THE INVENTION (a) Field of the Invention

The present invention relates to a light emitting display device using a demultiplexer. More specifically, the present invention relates to power wiring of a light emitting display device using a demultiplexer.

(b) Description of the Related Art

A display device needs a scan driver for driving scan lines and a data driver for driving data lines. The data driver has as many output terminals as the number of data lines in order to convert digital data signals into analog signals and apply them to all the data lines. In general, the data driver is configured by a plurality of integrated circuits (ICs). A plurality of ICs are used to drive all the data lines since the number of output terminals had by a single IC is limited. Hence, demultiplexers are adopted so as to reduce the number of data drive ICs.

For example, a 1:2 demultiplexer receives data signals that are time-divided and applied by the data driver through a signal line, divides them into two data groups, and outputs them to two data lines. Therefore, usage of a 1:2 demultiplexer reduces the number of data drive ICs by half. Recent liquid crystal displays (LCDs) and organic electroluminescent displays are beginning to mount the ICs for the data driver on the panel, and in this instance, there is a greater need to reduce the number of data drive ICs.

FIG. 1 shows a simplified block diagram of a conventional organic electroluminescent (EL) display using a demultiplexer. When the IC for the demultiplexer, the data driver, and the scan driver are manufactured to be directly mounted on the panel, power supply points, power supply lines, and power wiring are formed as shown in FIG. 1 to supply power to pixels. Scan driver 20 for applying select signals to select scan lines $SE_1$ to $SE_m$ is provided on the left of display area 10, and scan driver 30 for applying signals for controlling light emission to the emit scan lines $EM_1$ to $EM_m$ is provided on the right thereof. Scan driver 30 can be removed when the pixels do not use signals for controlling light emission. Demultiplex unit 40 and data driver 50 for applying data signals to data lines $D_1$ to $D_n$ are provided on the bottom of display area 10. Vertical lines 60 are formed in the vertical direction to supply power supply voltages to the respective pixels. Power cable 70 coupled to vertical line 60 on the top of the substrate is formed in the horizontal direction. Power cable 70 and external power supply cable 80 are coupled through power supply point 90. Power supply cable 80 surrounds the two scan drivers 20, 30 and accesses an external power source through a pad (not shown) formed on the bottom of the panel.

FIG. 2 shows a simplified circuit diagram of a pixel circuit of an organic EL display. The basic pixel circuit uses two transistors M1, M2, and does not use emit scan lines $EM_1$ to $EM_m$. In the pixel circuit of FIG. 2, when switching transistor M2 is turned on in response to a select signal from select scan line $SE_1$, the data voltage from data line $D_1$ is applied to a gate of driving transistor M1. A source-gate voltage at transistor M1 is stored in capacitor C1, and the current from driving transistor M1 is applied to organic EL element OLED in correspondence to the stored voltage, thereby displaying images.

Accordingly, the current is supplied to the OLED from power supply voltage VDD while the images are displayed in the pixel circuit of the organic EL display device. That is, voltage dropping is always generated because of the parasitic resistance provided on the wires since the current flows to vertical lines 60, power cable 70, and power supply cable 80 coupled to power supply voltage VDD while the images are displayed. Magnitudes of power supply voltage VDD are varied by the voltage dropping according to the position of the pixel circuit arranged along power cable 70 and vertical lines 60 from power supply point 90. Accordingly, the source-gate voltage at transistor M1 becomes different according to the position of the pixel circuit, the magnitude of the current supplied to the OLED becomes different, and the brightness becomes varied according to the position of the pixel circuit.

U.S. Pat. No. 6,229,506 issued to Dawson and U.S. patent publication No. 2002/0033718 of Tam disclose pixels circuits for compensating for the voltage dropping. The Dawson patent discloses a pixel circuit for using voltage to program the voltage to capacitor C1 (referred to as a "voltage programming pixel circuit" hereinafter). The publication by Tam discloses a pixel circuit for using current to program the current to capacitor C1 (referred to as a "current programming pixel circuit" hereinafter). These circuits compensate for the source-gate voltage at a driving transistor stored in the capacitor by modifying the gate voltage at the driving transistor by as much as the source voltage at the driving transistor is varied by the voltage dropping. However, such circuits only compensate for the source-gate voltage at a driving transistor and fail to compensate for a margin needed for forming an operational point of the driving transistor.

In more detail, referring to FIG. 3, in the current programming pixel circuit the characteristic curves between the current and the drain voltage of the driving transistor according to the source-gate voltage of the current driving transistor at the time of emitting the light by the organic EL element are given as ①, ②, ③ and ④ of FIG. 3, and the characteristic curve between the current flowing through the organic EL element and the corresponding anode voltage of the organic EL element OLED is given as L1. The respective characteristic curves ①, ②, ③ and ④ in FIG. 3 correspond to the different source-gate voltages of the driving transistor. The current programming pixel circuit stores the voltage corresponding to the current flowing to the driving transistor, and allows the organic EL element to emit light through the current flowing to the driving transistor by the voltage stored in the capacitor, thereby compensating for the deviation of the transistor.

In this instance, operational point P is determined at the crossing point of the characteristic curve of the organic EL element, the characteristic curve of the driving transistor, and operational point P is to be established with a predetermined margin in the saturation region of the characteristic curves since it is impossible to compensate for the deviation of the driving transistor when operational point P digresses from the saturation region in the current programming pixel circuit. Since the margin is narrowed as the current flowing to the organic EL element is increased, a predetermined margin Mg is to be occupied at maximum current $I_{max}$ of the organic EL element.

When voltage dropping is generated at the power supply voltage, the characteristic curve of the driving transistor is moved to the left by magnitude Vd of the voltage drop, and operational point P is formed out of the saturation region. Accordingly, the characteristic curves of the driving transistor and the organic EL element are not compensated. Power consumption is increased since the difference between power supply voltage VDD and a voltage VSS coupled to a cathode of the organic EL element needs to be increased in order to occupy the margin in consideration of the voltage drop.

SUMMARY OF THE INVENTION

The present invention provides a light emitting display device using a demultiplexer for reducing voltage dropping. In accordance with exemplary embodiments of the present invention power consumption is reduced and uniform brightness is provided in the light emitting display device using a demultiplexer. Also, a power supply point is additionally formed in the area where the demultiplex unit is formed.

In one aspect of the present invention, a light emitting display device includes: a substrate including a display area displayed as a screen and a peripheral area external to the display area; a plurality of data lines, formed in the display area, for transmitting data signals for displaying images; a plurality of pixel circuits formed in the display area, and coupled to the data lines; a plurality of first signal lines, arranged in a first direction in the display area, for supplying a power supply voltage to the pixel circuits; a plurality of second signal lines formed in the peripheral area; a data driver, coupled to the second signal lines, for time-dividing first signals corresponding to the data signals, and transmitting the time-divided first signals to the second signal lines; a demultiplex unit including a plurality of demultiplexers, formed in the peripheral area, for respectively receiving the first signals from the second signal lines; a first power cable arranged in a second direction which substantially crosses the first direction in the peripheral area, and coupled to a first terminal of the second signal line; and a second power cable arranged in a second direction in the peripheral area, and coupled to a second terminal of the second signal line. The demultiplexer receives the first signal from the first signal line and transmits the data signals to at least two data lines.

The first power cable is insulated from the second signal line, and is formed between the data driver and the demultiplex unit.

The first power cable is insulated from the data lines extended to the peripheral area, and is formed between the demultiplex unit and the display area.

The demultiplexer includes a first switch coupled between a first data line from among the at least two data lines and the second signal line, and a second switch between a second data line from among the at least two data lines, the second signal line.

The first signal and the data signal are applied in the current format. The demultiplexer includes a plurality of sample/hold circuits, and at least two sample/hold circuits from among the sample/hold circuits sample the current applied through input terminals and respectively output the current corresponding to the sampled current to at least two data lines through output terminals.

The relationship:

$$C2 < \frac{C1}{N}$$

is satisfied, where C1 is parasitic capacitance formed in one data line, C2 is parasitic capacitance formed between the second signal line, the first power cable, and N is the number of data lines corresponding to one second signal line.

The light emitting display device further includes a plurality of third signal lines being insulated from the data lines, and crossing the data lines in the display area. The relationship:

$$Wv < \frac{Ws \times Wd}{N \times Wx},$$

is satisfied, where Wv is the width of the first power cable, N is the number of data lines corresponding to one second signal line, Wd is the width of a data line, Wx is the width of the second signal line, and Ws is the summation of the widths of the third signal lines.

The relationship:

$$C3 < \frac{C1}{N-1}$$

is satisfied, where C1 is parasitic capacitance formed in one data line, C3 is parasitic capacitance formed between the data line, and the first power cable, and N is the number of data lines corresponding to one second signal line.

The light emitting display device further includes a plurality of third signal lines being insulated from the data lines, crossing the data lines in the display area. The relationship:

$$Wv < \frac{Ws}{N-1}$$

is satisfied, where Wv is the width of the first power cable, N is the number of data lines corresponding to one second signal line, and Ws is the summation of the widths of the third signal lines.

The light emitting display device further includes a plurality of third signal lines being insulated from the data lines, crossing the data lines in the display area. The relationship:

$$Wv < \frac{m \times Ws \times Wd}{N \times Wx - Wd}$$

is satisfied, where Wv is the width of the first power cable, N is the number of data lines corresponding to one second signal line, Wd is the width of a data line, Wx is the width of the second signal line, and Ws is the summation of the widths of the third signal lines.

The light emitting display device further includes: first and second power supply cables, coupled to both ends of the first power cable, for transmitting the power supply voltage; and third and fourth power supply cables, coupled to both ends of the second power cable, for transmitting the power supply voltage.

In another aspect of the present invention, a light emitting display device includes: a substrate including a display area displayed as a screen, a peripheral area external to the display area; a plurality of data lines, formed in the display area, for transmitting data signals for displaying images; a plurality of pixel circuits formed in the display area, coupled to the data lines; a plurality of first signal lines, arranged in the display area, for supplying a power supply voltage to the pixel circuits; a demultiplex unit including a plurality of demultiplexers formed in the peripheral area, and respectively coupled to at least two data lines from among the data lines; a first power cable being formed between the demultiplex unit and the display area, being insulated from the data lines extended to the peripheral area, and crossing the data lines, the first power cable for transmitting the power supply voltage to a first end of the first signal line; and a driver, coupled to the demultiplex unit, for time-dividing a first signal corresponding to the data signal, and transmitting the time-divided signal to the demultiplexer. The demultiplexer receives the first signal from the data driver, and transmits the data signal to at least two data lines.

In still another aspect of the present invention, a light emitting display device includes: a substrate including a display area displayed as a screen, a peripheral area external to the display area; a plurality of data lines, formed in the display area, for transmitting data signals for displaying images; a plurality of pixel circuits formed in the display area, coupled to the data lines; a plurality of first signal lines, arranged in the display area, for supplying a power supply voltage to the pixel circuits; a demultiplex unit including a plurality of demultiplexers formed in the peripheral area, and respectively coupled to at least two data lines from among the data lines; a plurality of second signal lines formed in the peripheral area, and coupled to the demultiplexers; a data driver, coupled to the second signal lines, for time-dividing a first signal corresponding to the data signal, and transmitting the time-divided signal to the second signal lines; and a first power cable, insulated from the second signal lines, and formed to cross the second signal lines between the demultiplex unit and the data driver, for transmitting the power supply voltage to the first end of the first signal line. The demultiplexer receives the first signal from the data driver through the second signal line, and transmits the data signal to at least two data lines.

The data signal and the first signal are current-type signals, and the demultiplex unit sequentially samples the first signal sequentially applied during one horizontal period, and concurrently applies the sampled signal to the at least two data lines during a subsequent horizontal period.

The light emitting display device further includes a second power cable, substantially formed in parallel to the first power cable in the peripheral area, for transmitting the power supply voltage to a second end of the first signal line. The power supply voltage is externally supplied to both ends of the first power cable, both ends of the second power cable respectively.

DETAILED DESCRIPTION

Figure 1:
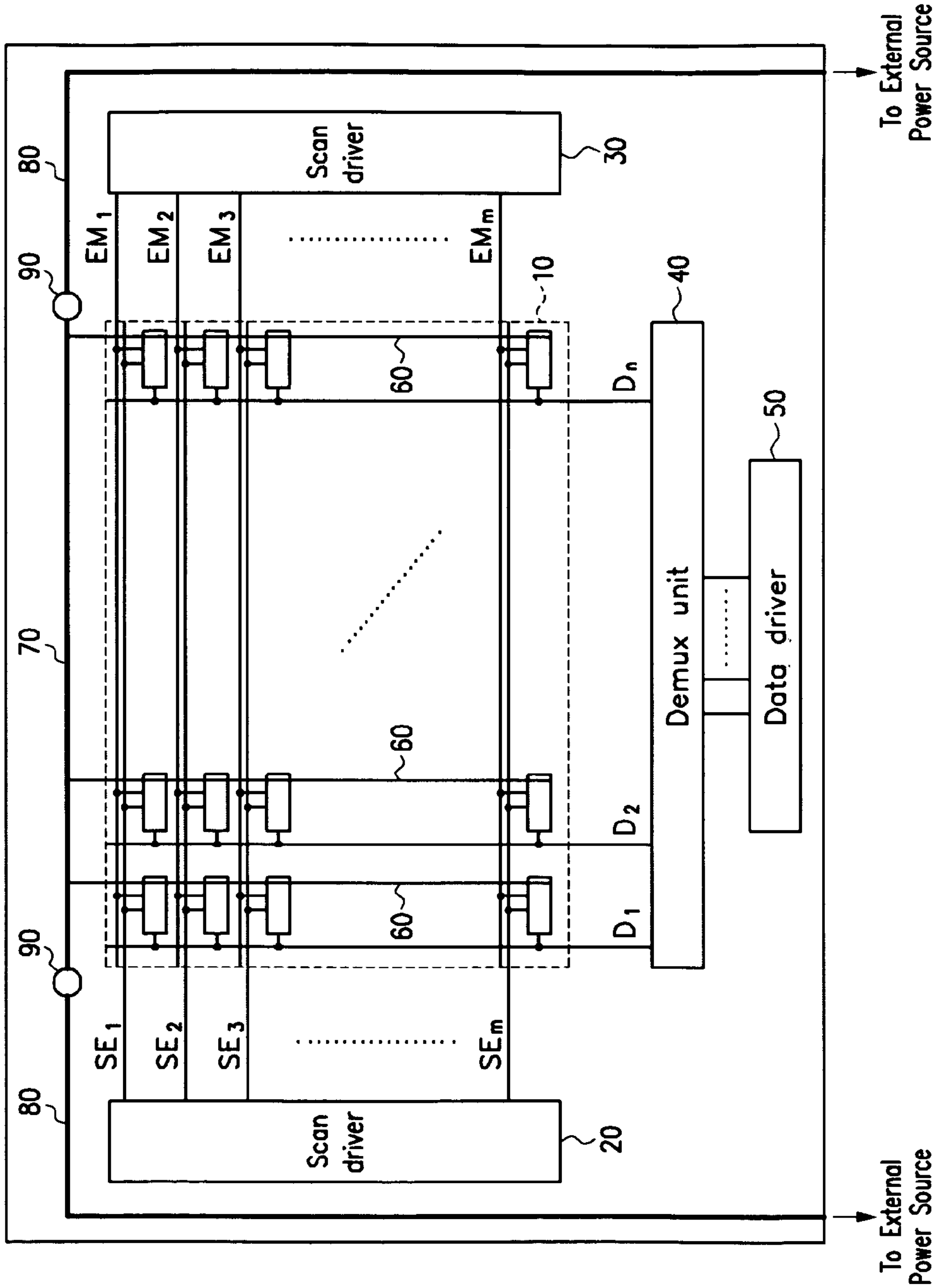
FIG. 1 shows a simplified block diagram of a conventional light emitting display device using a demultiplexer.
Figure 2:
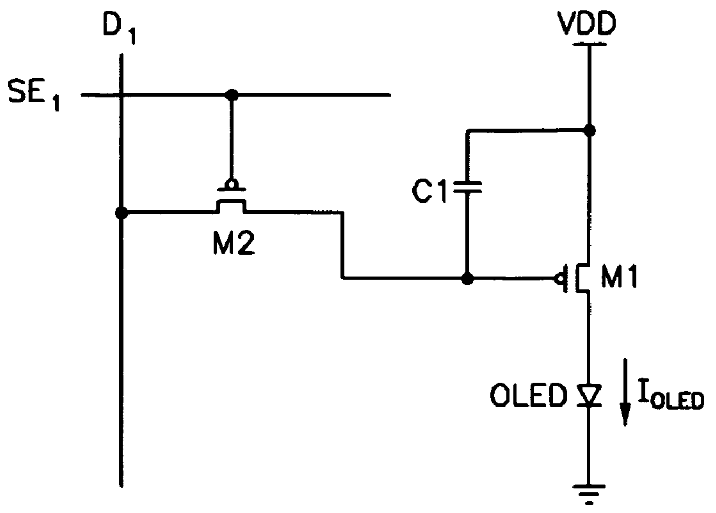
FIG. 2 shows a simplified circuit diagram of a pixel circuit of an organic EL display device.
Figure 3:
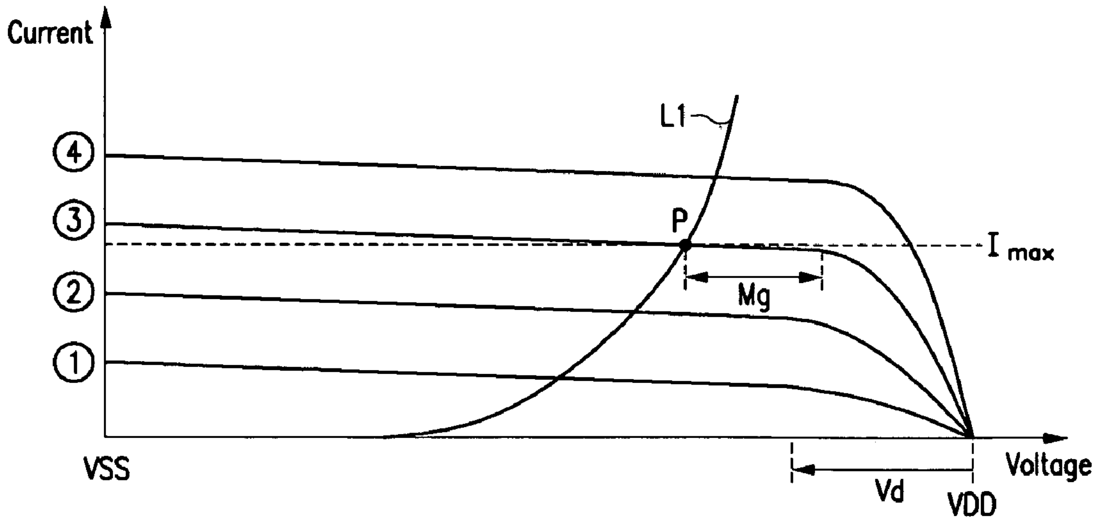
FIG. 3 shows relations of a characteristic curve of a driving transistor and a characteristic curve of an organic EL element when the current programming pixel circuit emits light.

It becomes necessary to reduce voltage dropping generated in the power cable and the vertical lines for transmitting voltages to the pixel circuit in order to occupy an operational margin of the pixel circuit with low power consumption even when the voltage dropping is compensated in the pixel circuit as described in the prior art. As shown in FIG. 1, the current is supplied to the pixel circuit from an external power supply through the power supply cable and the power supply points. At least one power supply cable can be coupled to each power supply point, and the power supply cable can be coupled to an external power supply when coupled to another power supply cable at a position other than at the power supply point.

When a pad to be coupled to an external power supply is formed on the bottom of the panel, lengths of the power supply cables are the same since the power supply cables coupled to the power supply point are passed through the side of the scan driver and coupled to the bottom of the pad. However, widths of the power supply cables cannot be enlarged since they may occupy a light emitting area (a display area) on the panel, reduce a non-light-emitting area (a peripheral area), and when two power supply points are provided, substantial voltage dropping is generated in the power supply cable since a large current corresponding to half the total current which is supplied to the panel at the time of light emission flows through the power supply cable coupled to a power supply point. It is accordingly needed to add a power supply point, and when the power supply point is added to the power cable on the top of the panel, the non-light-emitting area is increased since the power supply cable coupled to the power supply point is passed through the side of the scan driver. To solve this problem, a power cable is added near the demultiplex unit, and a power supply point is formed on the power cable.

Figure 4:
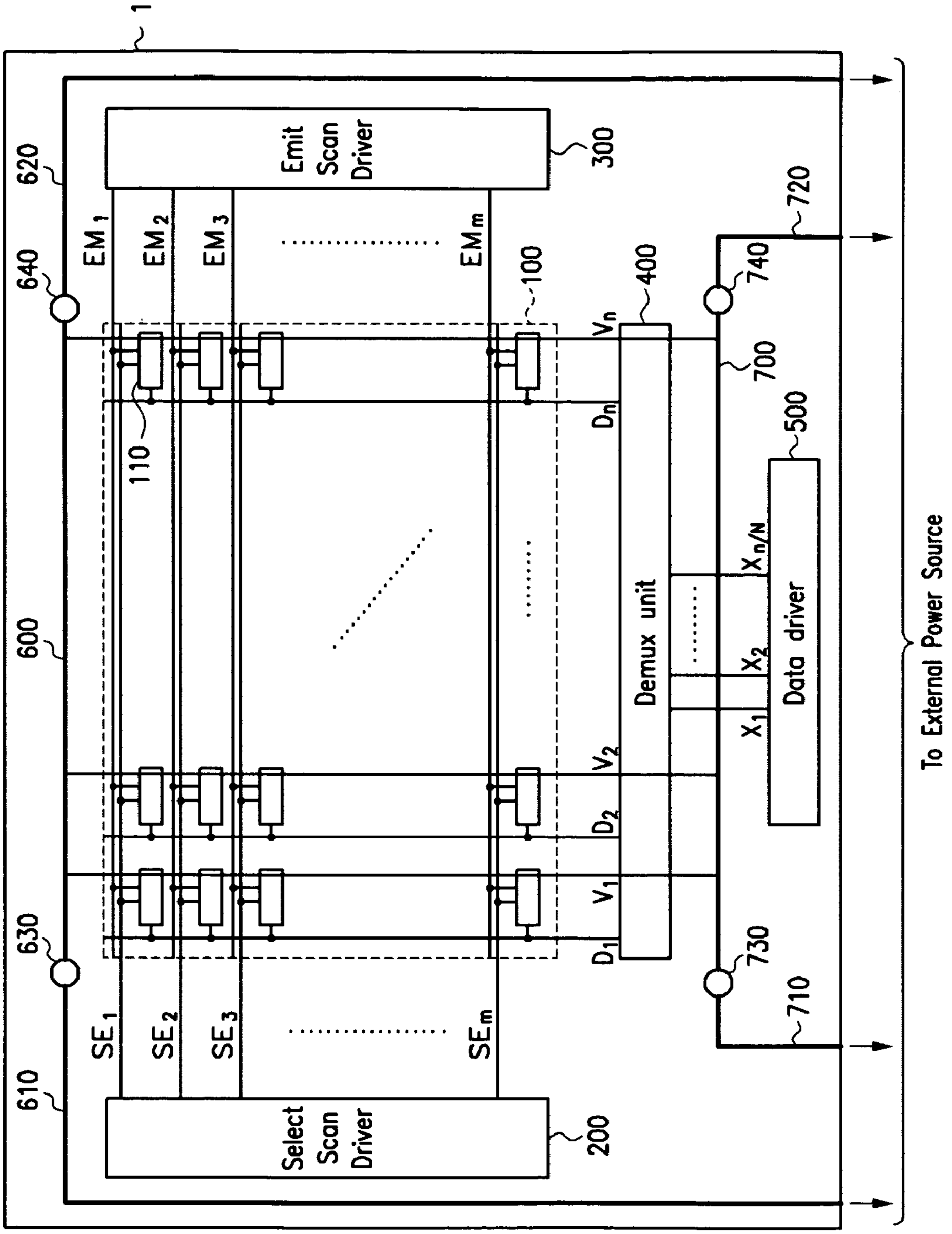
FIG. 4 shows a simplified block diagram of a light emitting display device using a demultiplexer according to a first exemplary embodiment of the present invention.
Figure 5:
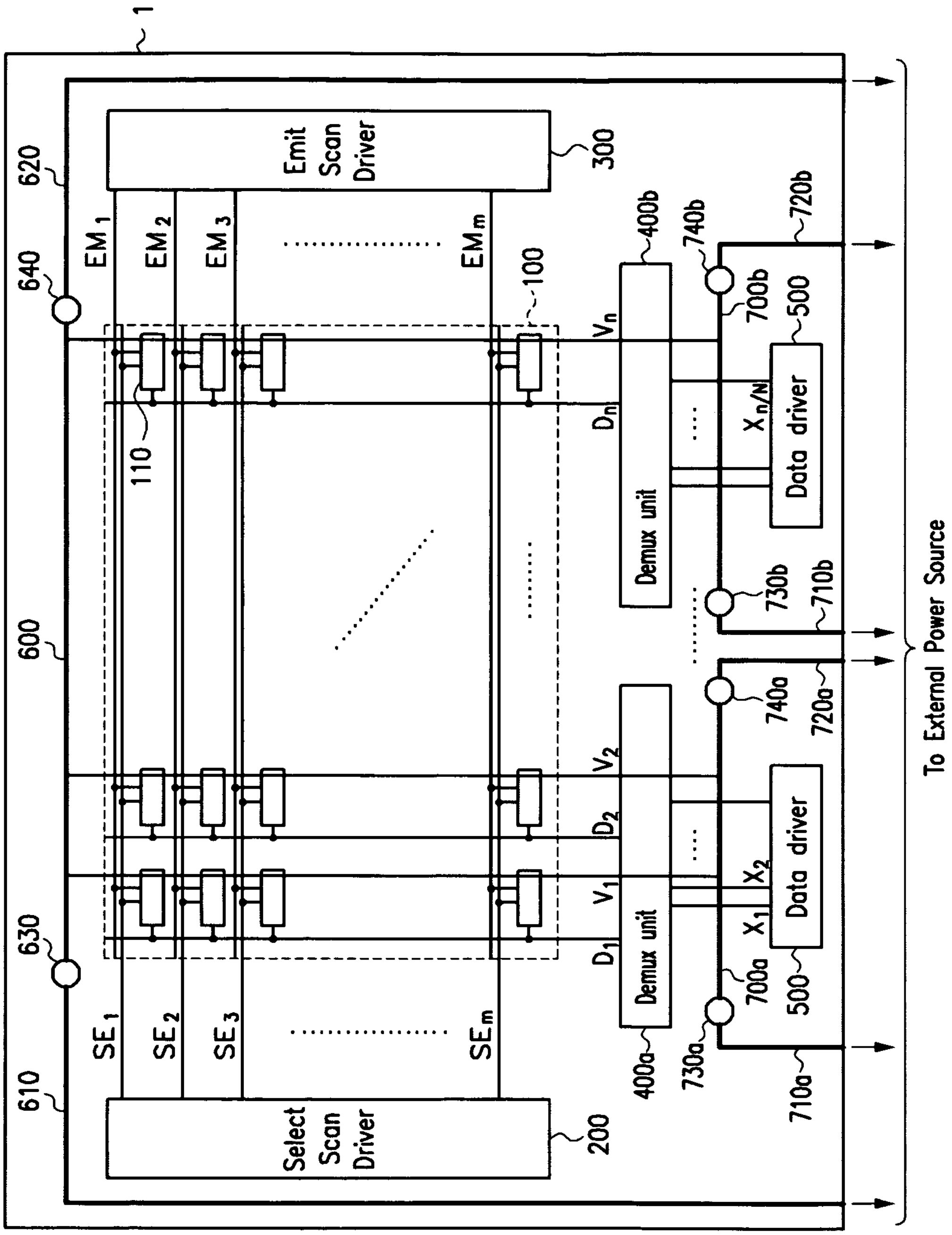
FIG. 5 shows the light emitting display device of FIG. 4 formed with a plurality of data drivers, demultiplexers.

Referring to FIGS. 4 and 5, a light emitting display device using a demultiplexer according to the first exemplary embodiment of the present invention will be described in more detail. FIG. 4 shows a simplified block diagram of a light emitting display device using a demultiplexer according to the first exemplary embodiment of the present invention. FIG. 5 shows the light emitting display device of FIG. 4 formed with a plurality of data drivers, demultiplexers.

As shown in FIG. 4, the light emitting display device includes a substrate 1 for forming a display panel. Substrate 1 is divided into a display area 100 which is visible to a user of the light emitting display device as a screen, that is, a light emitting area, and an external peripheral area, that is, a non-light-emitting area. Select scan driver 200, emit scan driver 300, demultiplex unit 400, and data driver 500 are formed on the peripheral area. Data driver 500 may also be formed not on the peripheral area of substrate 1 but at a separate position and be coupled to substrate 1, differing from location shown in FIG. 4.

Display area 100 includes a plurality of data lines $D_1$ to $D_n$, a plurality of select scan lines $SE_1$ to $SE_m$, a plurality of emit scan lines $EM_1$ to $EM_m$, and a plurality of pixel circuits 110. Scan lines $SE_1$ to $SE_m$ and $EM_1$ to $EM_m$ are formed on substrate 1, and gate electrodes (not shown) are coupled to the respective scan lines $SE_1$ to $SE_m$ and $EM_1$ to $EM_m$ which are covered with an insulation film (not shown). A semiconductor layer (not shown) made of amorphous silicon or polycrystalline silicon is formed on the bottom of the gate electrode with an insulation layer therebetween. Data lines $D_1$ to $D_n$ are formed on the insulation film which covers scan lines $SE_1$ to $SE_m$ and $EM_1$ to $EM_m$, and source or drain electrodes are coupled to the respective data lines $D_1$ to $D_n$. The gate electrode, the source electrode, and the drain electrode configure three terminals of a thin-film transistor (TFT). A semiconductor layer provided between the source electrode and the drain electrode is a channel layer of the transistor.

Still referring to FIG. 4, data lines $D_1$ to $D_n$ are arranged in the vertical direction and transmit data signals for displaying images to pixel circuits 110. Select scan lines $SE_1$ to $SE_m$ and emit scan lines $EM_1$ to $EM_m$ are arranged in the horizontal direction and transmit select signals and emit signals to pixel circuits 110. Two adjacent data lines and two select scan lines define a pixel area and pixel circuit 110 is formed at the pixel area.

Select scan driver 200 sequentially applies the select signals to select scan lines $SE_1$ to $SE_m$, and emit scan driver 300 sequentially applies the emit signals to emit scan lines $EM_1$ to $EM_m$. Data driver 500 time-divides and applies the data signals to demultiplex unit 400. Demultiplex unit 400 applies the data signals time-divided and input by data driver 500 to data lines $D_1$ to $D_n$. When demultiplex unit 400 performs 1:N demultiplexing, the number of signal lines $X_1$ to $X_{n/N}$ for transmitting the data signals to demultiplex unit 400 from data driver 500 is n/N. That is, signal line $X_1$ transmits the time-divided and applied data signals to N data lines $D_1$ to $D_N$.

Select and emit scan drivers 200, 300, demultiplex unit 400, and data driver 500 are mounted in an IC format on substrate 1, and are coupled to scan lines $SE_1$ to $SE_m$ and $EM_1$ to $EM_m$, signal lines $X_1$ to $X_{n/N}$, and data lines $D_1$ to $D_n$ formed on substrate 1. In addition, select and emit scan drivers 200, 300, demultiplex unit 400, and/or data driver 500 can be formed on the same layer as the layers on which scan lines $SE_1$ to $SE_m$ and $EM_1$ to $EM_m$, signal lines $X_1$ to $X_{n/N}$, and data lines $D_1$ to $D_n$ and transistors of the pixel circuits are formed on substrate 1. Further, data driver 500 can be mounted as a chip on a tape carrier package (TPC), a flexible printed circuit (FPC), or a tape automatic bonding (TAB) attached and coupled to demultiplex unit 400.

Referring again to FIG. 4, a plurality of vertical lines $V_1$ to $V_n$ for transmitting a power supply voltage to pixel circuits 110 are arranged in the vertical direction on display area 100, and are coupled to pixel circuits 110 arranged in the vertical direction. Vertical lines $V_1$ to $V_n$ can be formed on the same layer as that of data lines $D_1$ to $D_n$ without being superimposed on scan lines $SE_1$ to $SE_m$ and $EM_1$ to $EM_m$. Power cable 600 is formed in the horizontal direction on the top of substrate 1 and is coupled to first ends of vertical lines $V_1$ to $V_n$. Power cable 700 is provided in the horizontal direction to pass between demultiplex unit 400 and data driver 500. Vertical lines $V_1$ to $V_n$ are extended to pass through demultiplex unit 400. The extended ends of vertical lines $V_1$ to $V_n$ are coupled to power cable 700. In this instance, power cable 700 is formed on a layer different from that of signal lines $X_1$ to $X_{n/N}$ so that power cable 700 may not be superimposed on signal lines $X_1$ to $X_{n/N}$. To achieve this, power cable 700 is formed on the same layer as that of data lines $D_1$ to $D_n$, and signal lines $X_1$ to $X_{n/N}$ are formed on the same layer as that of scan lines $SE_1$ to $SE_m$ and $EM_1$ to $EM_m$. Alterately, power cable 700 may be formed on the same layer as that of scan lines $SE_1$ to $SE_m$ and $EM_1$ to $EM_m$ and signal lines $X_1$ to $X_{n/N}$ are formed on the same layer as that of data lines $D_1$ to $D_n$.

Power supply cables 610, 620 are formed on substrate 1 and are coupled to power cable 600 of display area 100 through power supply points 630, 640. In the same manner, power supply lines 710, 720 are formed on substrate 1, and are coupled to power cable 700 of display area 100 through power supply points 730, 740. Power supply cables 610, 620 are extended from power supply points 630, 640 to the outer side of scan drivers 200, 300 in the horizontal direction and are then extended in the vertical direction so that power supply cables 610, 620 may not be superimposed on scan lines $SE_1$ to $SE_m$ and $EM_1$ to $EM_m$, data lines $D_1$ to $D_n$, and signal lines $X_1$ to $X_{n/N}$. In a like manner, power supply cables 710, 720 are extended in the vertical direction from power supply points 730, 740 so that power supply cables 710, 720 may not be superimposed on scan lines $SE_1$ to $SE_m$, $EM_1$ to $EM_m$, data lines $D_1$ to $D_n$, and signal lines $X_1$ to $X_{n/N}$.

First ends of power supply cables 610, 620, 710, 720 arranged in the vertical direction are coupled to a pad (not shown). Power supply cables 610, 620, 710, 720 are coupled to an external circuit board through the pad and their widths are formed to be wider than those of vertical lines $V_1$ to $V_n$ since a large current to be supplied to the total pixel circuits of display area 100 flows to power cables 600, 700 and power supply cables 610, 620, 710, 720.

Accordingly, power supply points 630, 640, 730, 740 are increased by additionally forming a power cable 700 between demultiplex unit 400 and data driver 500 according to the first exemplary embodiment of the present invention, thereby reducing the voltage drop generated at the bottom of vertical lines $V_1$ to $V_n$.

The pad for coupling power supply cables 610, 620, 710, 720 to the external circuit board was formed on the bottom of substrate 1 in the first exemplary embodiment. When the pad is formed on the top of substrate 1, the voltage dropping is reduced by adding a power cable 700 between demultiplex unit 400 and data driver 500 and increasing power supply points 730, 740.

For example, when assuming that current $I_{data}$ flows to the pixel circuits, and when power supply point 90 is formed on the top of substrate 1 as shown in FIG. 1, the current of $m \times I_{data}$ flows through the vertical lines in pixel circuit 110 coupled to select scan line $SE_1$, and the current of $(m-1) \times I_{data}$ flows through the vertical lines in pixel circuit 110 coupled to select scan line $SE_2$. In this instance, when the parasitic resistance formed in the vertical line per pixel length is defined to be R, the voltage dropping by the amount obtained from Equation 1 is generated at the pixel circuit coupled to select scan line $SE_m$ in which the largest voltage dropping is generated.

$$\{m + (m-1) + \ldots + 1\} \times R \times I_{data} = \frac{m \times (m+1) \times R \times I_{data}}{2} \quad \text{Equation 1}$$

When power supply points 730, 740 are increased by additionally forming power cable 700 at the bottom as described in the first exemplary embodiment, pixel circuit 110 with the greatest voltage drop is pixel circuit 110 provided on the center. Since power cables 600, 700 are positioned on the top and bottom of substrate 1, the current of $(m/2)\times I_{data}$ flows through the vertical line to pixel circuit 110 coupled to select scan lines $SE_1$, $SE_m$, and the current of $((m/2)-1)\times I_{data}$ flows through the vertical line to pixel circuit 110 coupled to select scan lines $SE_2$, $SE_{m-1}$. Therefore, the voltage dropping by the amount given in Equation 2 is generated at the pixel circuit coupled to select scan line $SE_{m/2}$ with the greatest voltage drop. That is, the magnitude of the voltage drop is reduced to ¼ by adding power cable 700 and power supply points 730, 740 to the bottom of substrate 1.

$$\{m/2+(m/2-1)+\ldots+1\}\times R\times I_{data} = \frac{m/2\times(m/2+1)\times R\times I_{data}}{2} \qquad \text{Equation 2}$$

It is more effective to add the power supply point to the bottom of substrate 1 since the magnitude of the voltage drop is substantially reduced by ½ when two power supply points are added on the top of substrate 1. Hence, it is desirable to add the power supply points and power cable to the bottom of substrate 1 as described in the first exemplary embodiment, irrespective of the position of the pad coupled to the external circuit board.

It is described in FIG. 4 that one power cable 700 and two power supply points 730, 740 have been formed between demultiplex unit 400 and data driver 500. In FIG. 5, in another embodiment, the number of power supply points can be increased by additionally forming power supply points 730*a*, 740*a* and 730*b*, 740*b* respectively between two data drivers 500*a*, 500*b* when a plurality of demultiplex units 400*a*, 400*b* and data drivers 500*a*, 500*b* are formed.

As described above, since the width of power cable 700 is large, a large parasitic capacitance is formed by power cable 700, a large parasitic capacitance formed by data lines $D_1$ to $D_n$ and scan lines $SE_1$ to $SE_n$ and $EM_1$ to $EM_n$ is coupled as a load to demultiplex unit 400. Hence, when power cable 700 is formed between demultiplex 400 and data driver 500 as described in the first exemplary embodiment, the parasitic capacitance caused by power cable 700 operates as a load of data driver 500, and the load provided to demultiplex unit 400 is reduced. When power cable 700 is formed between demultiplex unit 400 and data driver 500, the signal line for transmitting a control signal for driving demultiplex unit 400 can be arranged so as to not be superimposed on power supply cables 710, 720. Accordingly, the parasitic capacitance which may occur because of the signal line is eliminated.

Figure 6:
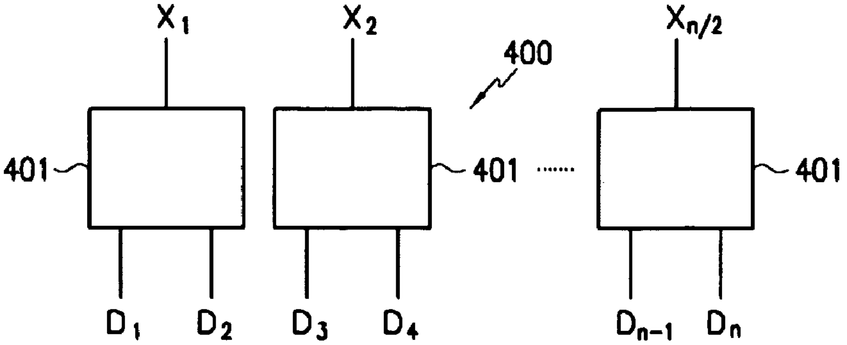
FIG. 6 shows a demultiplex unit according to an exemplary embodiment of the present invention.
Figure 7:
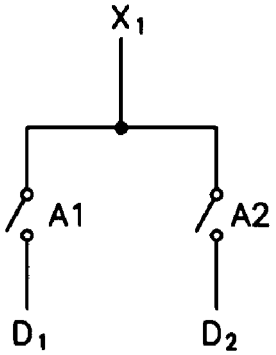
FIG. 7 shows a demultiplexer formed by analog switches.

A light emitting display device according to the first exemplary embodiment will be described together with exemplified demultiplex unit 400 which performs 1:2 demultiplexing. Referring to FIGS. 6 and 7, an embodiment of a demultiplex unit including analog switches will be described.

FIG. 6 shows a demultiplex unit according to an exemplary embodiment of the present invention and FIG. 7 shows a demultiplexer formed by analog switches. For ease of description, FIG. 7 illustrates first signal line $X_1$ with data lines $D_1$, $D_2$ corresponding to first signal line $X_1$.

As shown in FIG. 6, demultiplex unit 400 includes a plurality of demultiplexers 401. Referring to FIGS. 6 and 7, demultiplexer 401 is coupled between one signal line $X_1$ and two data lines $D_1$, $D_2$, and includes two switches A1, A2. First terminals of switches A1, A2 are coupled in common to signal line $X_1$, and second terminals of switches A1, A2 are coupled to data lines $D_1$, $D_2$. Switches A1, A2 are sequentially turned on to sequentially transmit the data signals time-divided and applied by signal line $X_1$ to data lines $D_1$, $D_2$.

In the case of using the above-noted analog switches A1, A2, the data signals in the voltage and current formats can be transmitted to data lines $D_1$, $D_2$ through signal line $X_1$.

Referring now to FIGS. 8 to 11, a demultiplex unit including circuits for sampling and holding the current in the light emitting display device according to the first exemplary embodiment will be described. For ease of description, FIGS. 8 to 11 illustrate first signal line $X_1$, with data lines $D_1$, $D_2$ corresponding to first signal line $X_1$.

A configuration and operation of the demultiplexer including sample/hold circuits will now be described with reference to FIGS. 8 to 11.

Figure 8:
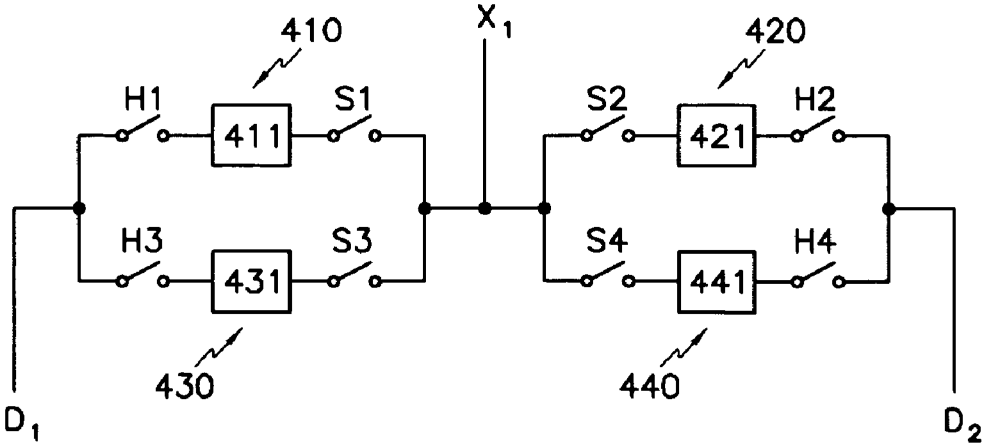
FIG. 8 shows a demultiplexer formed by sample/hold circuits.

FIG. 8 shows a demultiplexer formed by sample/hold circuits.

As shown, demultiplexer 401 includes four sample/hold circuits 410, 420, 430, 440 which respectively include sampling switches S1, S2, S3, S4, data storage elements 411, 421, 431, 441 and holding switches H1, H2, H3, H4. First terminals of sampling switches S1, S2, S3, S4 of sample/hold circuits 410, 420, 430, 440 are coupled to data storage elements 411, 421, 431, 441 and first terminals of holding switches H1, H2, H3, H4 are coupled to data storage elements 411, 421, 431, 441. Second terminals of sampling switches S1, S2, S3, S4 of sample/hold circuits 410, 420, 430, 440 are coupled in common to signal line $X_1$. Second terminals of holding switches H1, H3 of sample/hold circuits 410, 430 are coupled in common to data line $D_1$, and second terminals of holding switches H2, H4 of sample/hold circuits 420, 440 are coupled in common to data line $D_2$. The terminals coupled to signal line $X_1$ are referred to as input terminals, and the terminals coupled to data lines $D_1$, $D_2$ are referred to as output terminals.

Respective sample/hold circuits 410, 420, 430, 440 sample the currents transmitted through sampling switches S1, S2, S3, S4 and store them in data storage elements 411, 421, 431, 441 in the voltage format when sampling switches S1, S2, S3, S4 are turned on, and they hold the currents corresponding to the voltages stored in data storage elements 411, 421, 431, 441 through holding switches H1, H2, H3, H4 when holding switches H1, H2, H3, H4 are turned on.

In this instance, "To sample" is defined as to write the input current in the data storage element in the voltage format. "To standby" is defined as to maintain the data written in the data storage element. "To hold" is defined as to output the current corresponding to the data written in the data storage element.

Next, the operation of the demultiplexer according to the exemplary embodiment of the present invention will be described with reference to FIGS. 9 and 10A to 10D.

Figure 9:
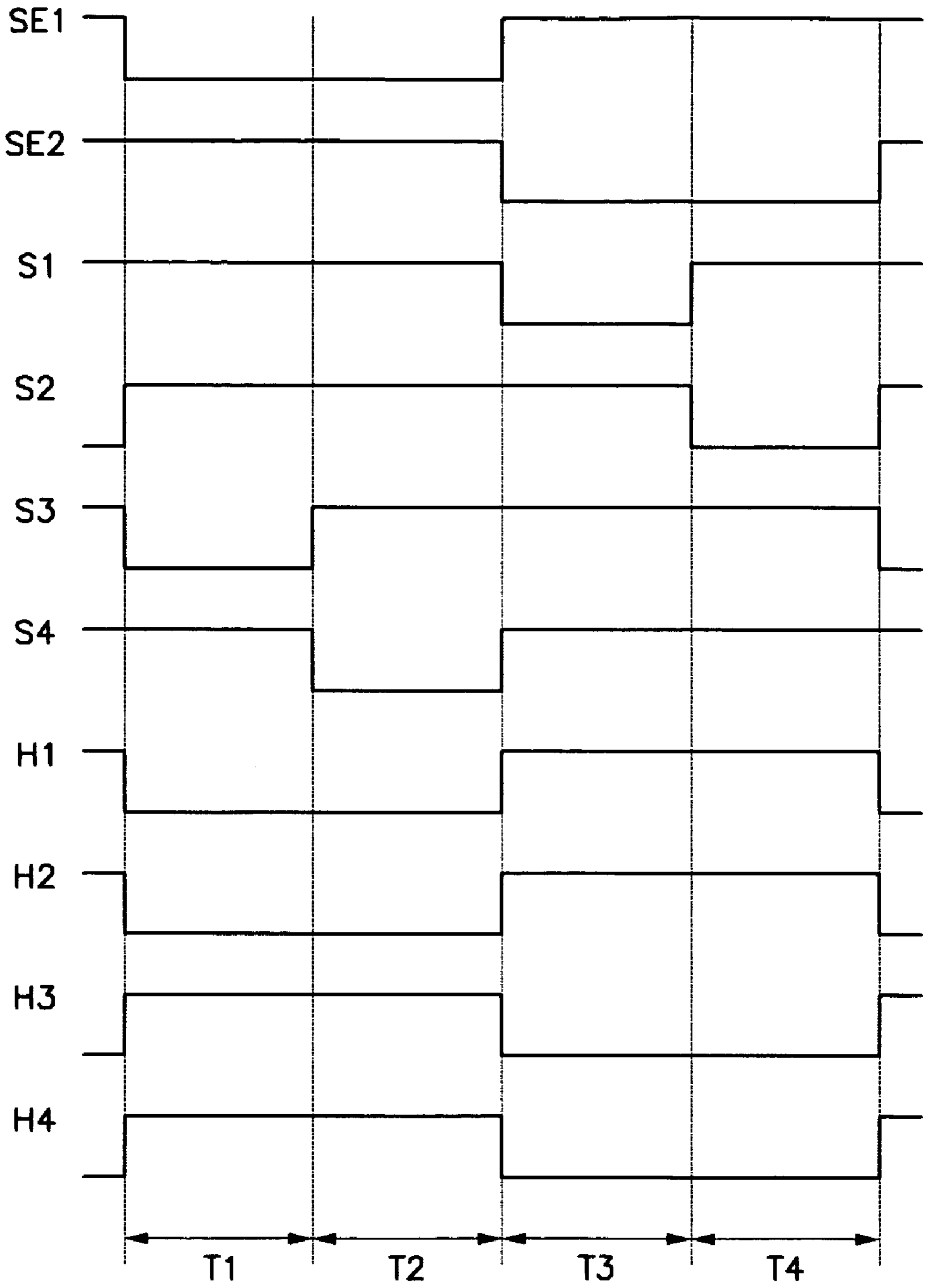
FIG. 9 shows a timing diagram of switches of the demultiplexer of FIG. 8.

FIG. 9 shows a timing diagram of a switch of the demultiplexer. FIGS. 10A to 10D show operations of the demultiplexer shown in FIG. 8 according to the timing diagram shown in FIG. 9. In FIG. 9, low levels indicate that the switches are turned on, and high levels depict that the switches are turned off.

Figure 10A:
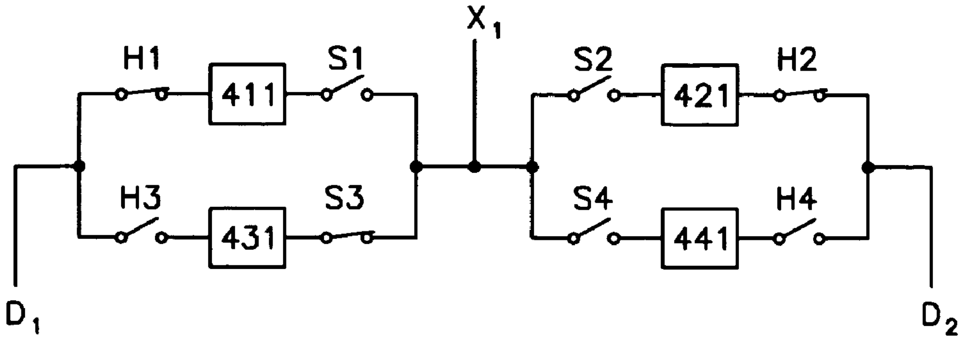
FIGS. 10A to 10D show an operation of the demultiplexer of FIG. 8 according to the timing of FIG. 9.

Referring to FIGS. 9 and 10A, sampling switch S3 and holding switches H1, H2 are turned on in interval T1. When sampling switch S3 is turned on and the data current applied through signal line $X_1$ is sampled to data storage element 431. When holding switches H1, H2 are turned on and the currents corresponding to the data respectively stored in data storage elements 411, 421 are held to data lines $D_1$, $D_2$. The sample/ hold circuit with turned-off sampling switch S4 and holding switch H4 stays in the standby mode.

Figure 10B:
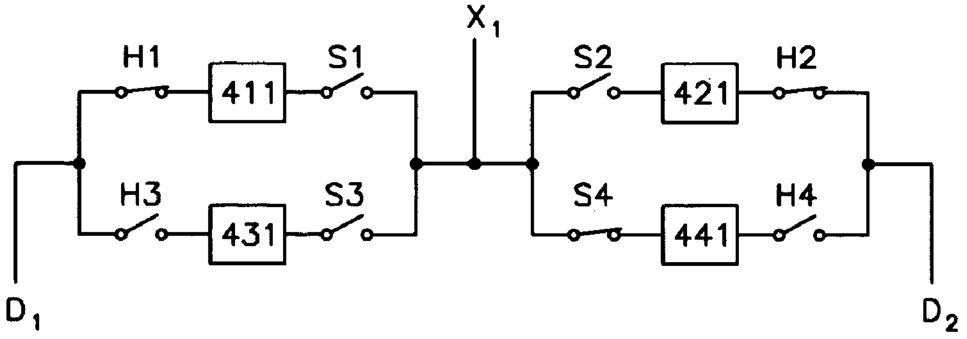

Referring to FIGS. 9 and 10B, sampling switch S3 is turned off and sampling switch S4 is turned on while holding switches H1, H2 are turned on in interval T2. The currents corresponding to the data stored in data storage elements 411, 421 are consecutively held to data lines $D_1$, $D_2$ since holding switches H1, H2 are turned on. When sampling switch S4 is turned on, the data current applied through signal line $X_1$ is sampled into data storage element 441.

Figure 10C:
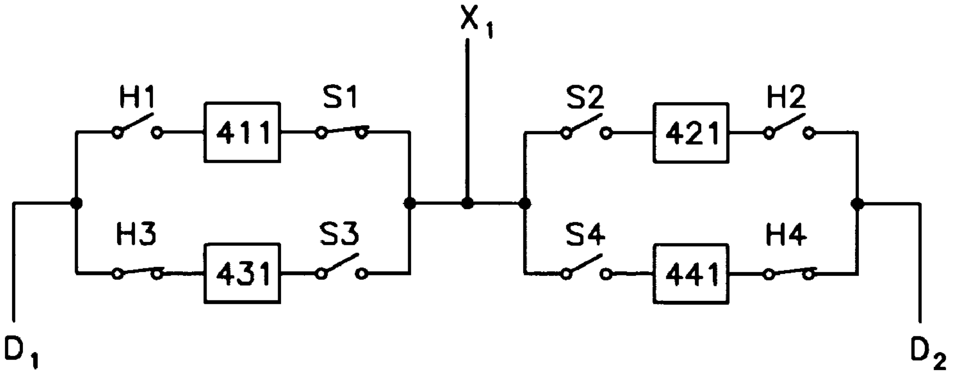

Referring to FIGS. 9 and 10C, sampling switch S4 and holding switches H1, H2 are turned off and sampling switch S1 and holding switches H3, H4 are turned on in interval T3. When sampling switch S1 is turned on and the data current applied through signal line $X_1$ is sampled into data storage element 411. When holding switches H3, H4 are turned on, the currents corresponding to the data respectively stored in data storage elements 431, 441 in intervals T1, T2 are held to data lines $D_1$, $D_2$.

Figure 10D:
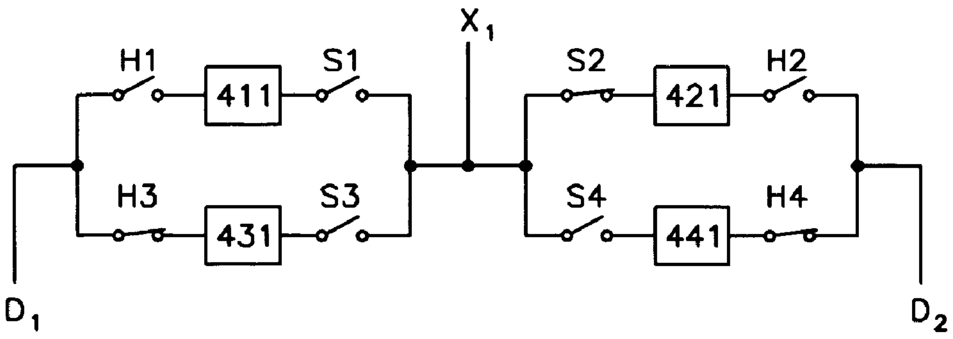

Referring to FIGS. 9 and 10D, sampling switch S1 is turned off and sampling switch S2 is turned on while holding switches H3, H4 are turned on in interval T4. The currents corresponding to the data respectively stored in data storage elements 431, 441 are consecutively held to data lines $D_1$, $D_2$ since holding switches H3, H4 are turned on. When sampling switch S2 is turned on, the data current applied through signal line $X_1$ is sampled into data storage element 421.

In this instance, intervals T1, T2 correspond to a period (referred to as a "horizontal period" hereinafter) during which data are applied by a select signal to the pixel circuit coupled to the scan line of a row, and intervals T3, T4 correspond to a subsequent horizontal period. The time for programming the data to the pixel is accordingly obtained since the data current can be consecutively applied to the data line during one horizontal period. The data current can be transmitted to the data line during one frame since intervals T1 to T4 are repeated.

Since the four sample/hold circuits included in the demultiplexer of FIG. 8 can be realized in the substantially same manner, only one sample/hold circuit 410 will be described, with reference to FIG. 11. As shown, the sample/hold circuit is coupled between signal line $X_1$ and data line $D_1$, and includes transistor M1, capacitor Ch and five switches Sa, Sb, Sc, Ha, Hb. Data line $D_1$ is formed with parasitic resistance components and parasitic capacitance components. The parasitic resistance components are given as R1, R2, the parasitic capacitance components are given as C1, C2, C3, and transistor M1 is shown as a metal oxide semiconductor field-effect transistor (MOSFET) in FIG. 11.

Switch Sa is coupled between power supply voltage VDD1 and a source of transistor M1, and switch Ha is coupled between power supply voltage VSS1 and a drain of transistor M1. Since transistor M1 is a p channel type, power supply voltage VDD1 supplies a voltage which is greater than power supply voltage VSS1, and power supply voltage VDD1 can be supplied by vertical lines $V_1$ to $V_n$ coupled to power cable 700. Switch Sb is coupled between signal line $X_1$ and a gate of transistor M1, and switch Hb is coupled between the source of transistor M1 and data line $D_1$. Switch Sc is coupled between signal line $X_1$ and the drain of transistor M1 and diode-connects transistor M1 when switches Sb, Sc are turned on. Further, switch Sc can be coupled between the gate and the drain of transistor M1 and diode-connect transistor M1. When switch Sc is coupled between the gate and the drain of transistor M1, switch Sb can be coupled between signal line $X_1$ and the drain of transistor M1.

Next, operation of the sample/hold circuit shown in FIG. 11 will be described. Switches Sa, Sb, Sc are turned on and off with substantially the same timing. Switches Ha, Hb are also turned on and off with substantially the same timing.

When the switches Sa, Sb, Sc are turned on and the switches Ha, Hb are turned off, transistor M1 is diode-connected and the current is supplied to capacitor Ch to charge it with a voltage and the potential at the gate of transistor M1 is reduced to make the current flow to the drain from the source. When the charged voltage at capacitor Ch is increased and the drain current of transistor M1 corresponds to the data current $I_{DATA1}$ provided by signal line $X_1$ as time passes, the charged voltage at capacitor Ch is stopped and capacitor Ch is charged with a constant voltage. That is, the source-gate voltage of $V_{SG}$ at transistor M1 is charged in capacitor Ch and the source-gate voltage of $V_{SG}$ corresponding to the data current $I_{DATA1}$ provided by signal line $X_1$. Accordingly, sample/hold circuit 410 samples the data current $I_{DATA1}$ provided by signal line $X_1$.

When switches Sa, Sb, Sc are turned off and switches Ha, Hb are turned on, the current corresponding to the source-gate voltage of $V_{SG}$ charged in capacitor Ch is transmitted to data line $D_1$ through switch Hb. Accordingly, sample/hold circuit 410 holds the current to data line $D_1$.

Sample/hold circuit 410 maintains the voltage charged in capacitor Ch since switches Sa, Sb, Sc, Ha, Hb are turned off while sample/hold circuit 420 of FIG. 8 performs sampling in interval T2. That is, sample/hold circuit 410 stays in the standby mode.

Since sample/hold circuit 410 performs sampling when switches Sa, Sb, Sc are turned on and switches Sa, Sb, Sc correspond to sampling switch S1 of FIG. 8. Since sample/hold circuit 410 performs holding when switches Ha, Hb are turned on, switches Ha, Hb correspond to holding switch H1 of FIG. 8. Since capacitor C1 and transistor M1 store the voltage corresponding to the data current, capacitor C1 and transistor M1 correspond to data storage element 411.

As a result, the timing of switches Sa, Sb, Sc substantially corresponds to the timing of sampling switch S1, while the timing of switches Ha, Hb substantially corresponds to the timing of holding switch H1, the timing may be different because of delays in the circuits. Switches Sa, Sb, Sc are controlled by a single control signal or different control signals, and switches Ha, Hb are controlled by a single control signal or different control signals in a like manner. Switches Sa, Sb, Sc, Ha, Hb of FIG. 9 can be realized by p channel or n channel FETs.

Figure 11:
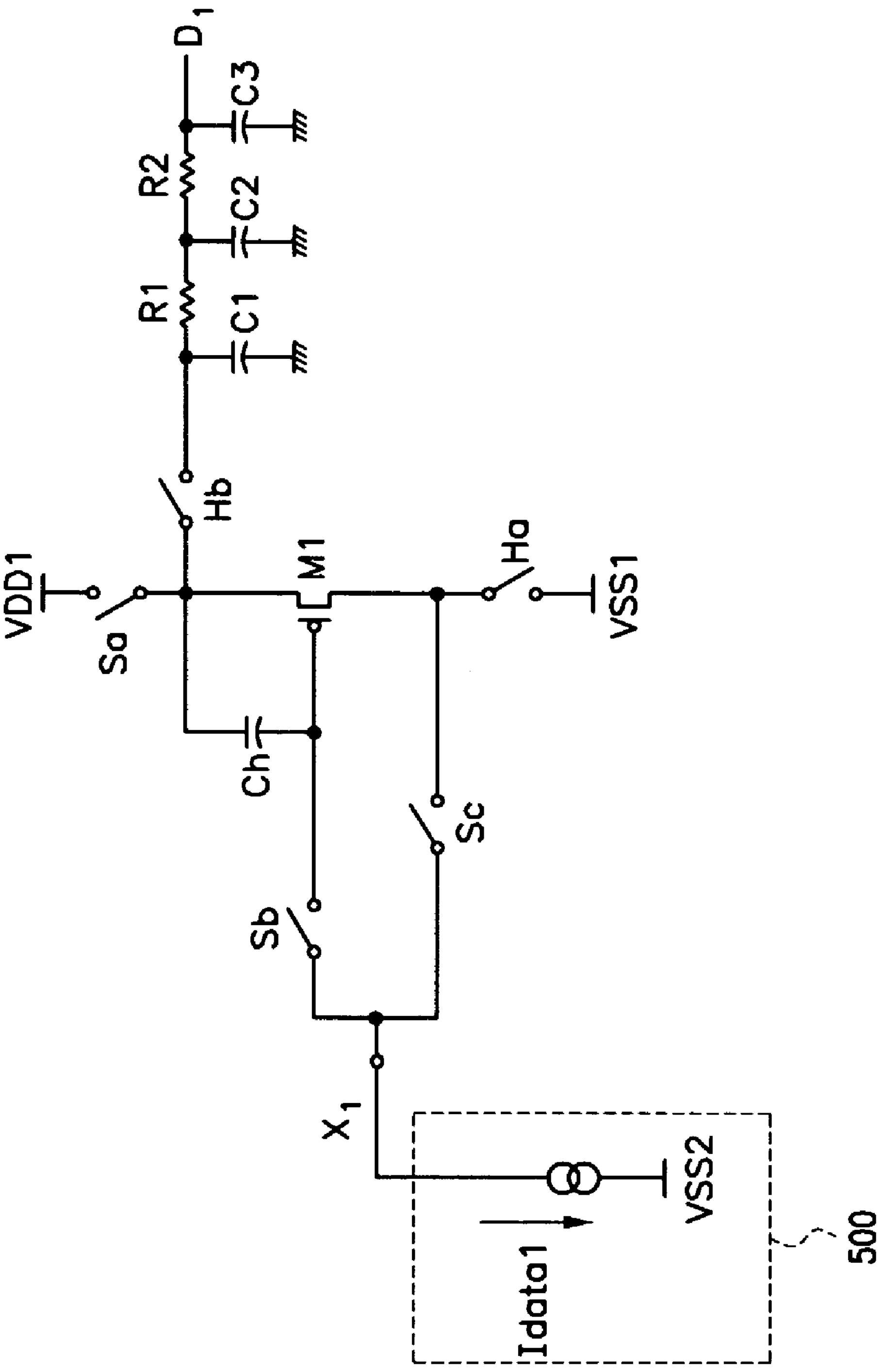
FIG. 11 shows a simplified circuit diagram of the sample/hold circuit of FIG. 8.

The sample/hold circuit in FIG. 11 sources the data current to signal line $X_1$, that is, the input terminal during the sampling operation, sinks the data current from data line $D_1$, that is, the output terminal during the holding operation. Therefore, the sample/hold circuit in FIG. 11 can be used together with data driver 500 for sinking the data current at signal line $X_1$ (i.e., the output terminal is a current sink type). The cost of data driver 500 is reduced since the drive IC with the current sink type of output terminal is inexpensive compared to the drive IC with the current source type of output terminal.

In addition, when transistor M1 is realized by an n channel field-effect transistor (FET), with relative voltage levels of power supply voltages VDD1, VSS1 in FIG. 11, a sample/hold circuit with the current sink type of input terminal and the current source type of output terminal is implemented. No corresponding description on the configuration of the sample/hold circuit will be provided since it is well known to a person skilled in the art.

As described, the demultiplexer of FIG. 8 sequentially samples the data current that is time-divided and applied through the signal line $X_1$ during a horizontal period, and concurrently applies the sampled current to data lines $D_1$, $D_2$ during a next horizontal period. When the demultiplexer performs a 1:N demultiplexing operation, a time for the demultiplexer to sample the data current corresponding to one data line $D_1$ corresponds to 1/N times of one horizontal period. Hence, the width of power cable 700 is established so that the data current may be sampled during the time which corresponds to 1/N times of one horizontal period. A condition of power cable 700 will now be described.

In order to satisfy the above-described sampling condition, it is needed for the capacitance at signal line $X_1$ when data driver 300 applies the data current through signal line $X_1$ to be less than the 1/N of the capacitance at data line $D_1$ when demultiplex unit 400 applies the sampled current through data line $D_1$, assuming that the magnitude of the parasitic capacitance formed by data line $D_1$, m select scan lines $SE_1$ to $SE_m$, and m emit scan lines $EM_1$ to $EM_m$ is C1, and the magnitude of the parasitic capacitance formed by signal line $X_1$, power cable 700 is C2.

Referring back to FIG. 4, when data driver 500 applies the data current corresponding to a data line to demultiplex unit 400 through signal line $X_1$, the parasitic capacitance of C2 is formed by signal line $X_1$ and power cable 700. When demultiplex unit 400 applies the sampled data current to data line $D_1$, the parasitic capacitance of C1 is formed. Hence, as described above, the condition given in Equation 3 is satisfied between the parasitic capacitance of C2 at signal line $X_1$ and the parasitic capacitance of C1 at data line $D_1$.

$$C2 < \frac{C1}{N} \quad \text{Equation 3}$$

As described in FIG. 4, signal line $X_1$ is formed on one of the layer on which data line $D_1$ is formed and the layer on which scan lines $SE_1$ to $SE_m$ and $EM_1$ to $EM_m$ are formed, and power cable 700 is formed on the other layer. Therefore, the same insulation film is formed between signal line $X_1$, power cable 700 and between data line $D_1$, scan lines $SE_1$ to $SE_m$ and $EM_1$ to $EM_m$ so that the two types of capacitance have the same permittivity, the distance between signal line $X_1$, power cable 700 corresponds to the distance between data line $D_1$, scan lines $SE_1$ to $SE_m$ and $EM_1$ to $EM_m$.

In general, the capacitance formed by two flat metallic panels is proportional to the area thereof, and inversely proportional to the distance between them. The distance between the two facing flat metallic panels and the permittivity are the same for parasitic capacitances C1, C2. The length of one side of the flat metallic panel which forms parasitic capacitance C1 is given as a width of one data line $D_1$, and the length of another side thereof is given as widths of m select scan lines $SE_1$ to $SE_m$ and m emit scan lines $EM_1$ to $EM_m$, while the length of one side of the flat metallic panel which forms parasitic capacitance C2 is given as a width of one signal line $X_1$, and the length of another side thereof is given as a width of power cable 700. In this instance, when the width of the data line $D_1$ is Wd, the width of the signal line $X_1$ is Wx, the summation of the widths of the select scan line $SE_1$ and the emit scan line $EM_1$ is Ws, and the width of the power cable 700 is Wv, the condition of Equation 4 is derived from Equation 3. Therefore, when the width Wv of power cable 700 satisfies the condition of Equation 5, the demultiplex unit can perform the sampling within a given time.

$$Wx \times Wv < \frac{m \times Ws \times Wd}{N} \quad \text{Equation 4}$$

$$Wv < \frac{m \times Ws \times Wd}{N \times Wx} \quad \text{Equation 5}$$

The widths of power cable 700, data line $D_1$, signal line $X_1$, and scan lines $SE_1$ to $SE_m$ and $EM_1$ to $EM_m$ represent widths at regions where they cross other lines, which will be identically applied to subsequent embodiments.

The upper limit of the power cable is determined according to Equation 5, and the width Wv of power cable 700 is to be wider than the condition of Equation 5 in order to improve the voltage dropping. The embodiment for performing sampling within the given time and further widening the widths Wv of power cable 700 will now be described with reference to FIG. 12.

Figure 12:
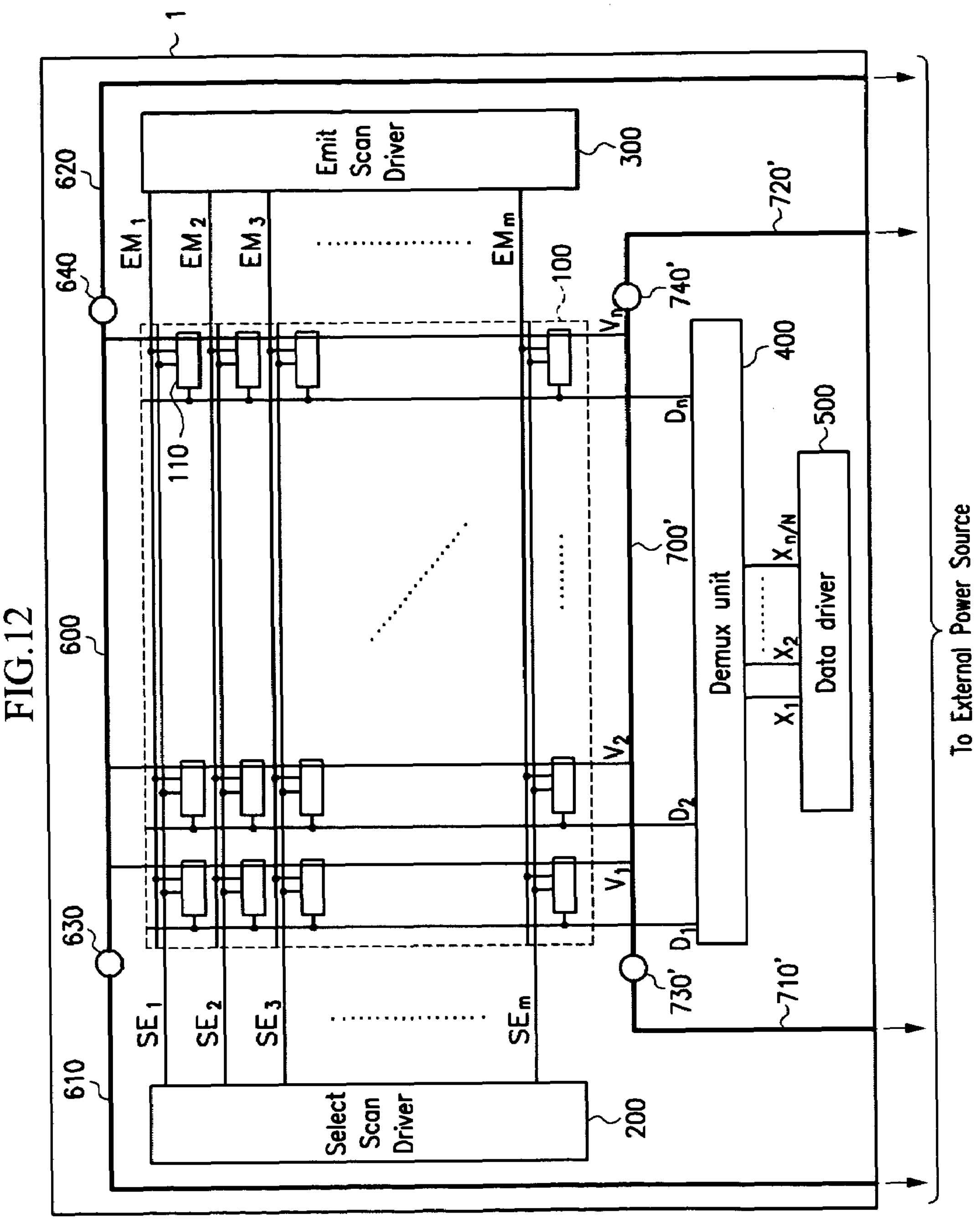
FIG. 12 shows a simplified block diagram of a light emitting display device using a demultiplexer according to a second exemplary embodiment of the present invention.

FIG. 12 shows a simplified block diagram of a light emitting display device using a demultiplexer according to a second exemplary embodiment of the present invention. The width of power cable 700' is increased by forming power cable 700' between display area 100, demultiplex unit 400. As shown, the light emitting display device according to the second exemplary embodiment has the same structure as that of the light emitting display device of FIG. 4 except for the position of power cable 700'. Power cable 700' is arranged in the horizontal direction to pass between display area 100 and demultiplex unit 400 and is coupled to vertical lines $V_1$ to $V_n$ arranged in the vertical direction. In this instance, power cable 700' can be formed on the same layer as that on which select scan lines $SE_1$ to $SE_m$ are formed, other than the layer on which data lines $D_1$ to $D_n$ are formed, so that power cable 700' may not be superimposed on data lines $D_1$ to $D_n$.

A light emitting display device according to the second exemplary embodiment will be described with the exemplified demultiplex unit 400. For ease of description, demultiplex unit 400 is described to perform 1:2 demultiplexing.

The embodiment of the demultiplex unit including the sample/hold circuits of FIGS. 8 to 11 in the light emitting display device of FIG. 12 will now be described. In the same manner as the first exemplary embodiment, demultiplexer 401 according to the second embodiment sequentially samples the data current that is time-divided and applied through signal line $X_1$ during one horizontal period, and concurrently applies the sampled current to data lines $D_1$, $D_2$ during the next horizontal period.

The load to be driven by data driver 500 is increased because of power cable 700' when a 1:N demultiplexer using the sample/hold circuits is used in the light emitting display device of FIG. 4, but the load to be driven by demultiplex unit 400 is increased because of power cable 700' in the light emitting display device of FIG. 12. In the second embodiment, power cable 700 is provided between display area 100 and demultiplex unit 400, and the condition for allowing the magnitude of the load to be driven during a horizontal period to be less than that of the first embodiment is established, assuming that the magnitude of the parasitic capacitance formed by data line $D_1$, m select scan lines $SE_1$ to $SE_m$, and m emit scan lines $EM_1$ to $EM_m$ is C1, and the magnitude of the parasitic capacitance formed by data line $D_1$ and power cable 700' is C3. As a result, since demultiplex unit 400 must drive the capacitance of C1+C3 formed in data line $D_1$ during a horizontal period in the second exemplary embodiment, data driver 500 must drive N times the capacitance of C2 formed in signal line $X_1$ in the first exemplary embodiment, the relation of Equation 6 is satisfied.

$$N \times C2 > C1 + C3 \quad \text{Equation 6}$$

In this instance, the permittivities and the distances between scan lines $SE_1$ to $SE_m$ and $EM_1$ to $EM_m$, and data line $D_1$, between power cable 700 and data line $D_1$, and power cable 700 of FIG. 4 and signal line $X_1$ are substantially the same. Therefore, when the width of data line $D_1$ is Wd, the width of signal line $X_1$ is Wx, the summation of the widths of select scan line $SE_1$, emit scan line $EM_1$ is Ws, and the width of power cable 700 is Wv, the condition of Equation 7 is derived from Equation 6. Therefore, the lower limit of the width Wv of power cable 700 can be established as given in Equation 8.

$$N \times (Wx \times Wv) > m \times Ws \times Wd + Wv \times Wd \quad \text{Equation 7}$$

$$Wv > \frac{m \times Ws \times Wd}{N \times Wx - Wd} \quad \text{Equation 8}$$

When capacitance C2 caused by data line $D_1$ and power cable 700' corresponds to capacitance C3 caused by signal line $X_1$ and power cable 700', Equations 6 and 8 are given as Equations 9 and 10.

$$C3 > \frac{C1}{N-1} \quad \text{Equation 9}$$

$$Wv > \frac{m \times Ws}{N-1} \quad \text{Equation 10}$$

The width of power cable 700' can be appropriately controlled so as to improve the voltage dropping since the lower limit of the width of power cable 700' is determined in the second exemplary embodiment.

Demultiplex unit 400 including analog switches in the light emitting display device of FIG. 12 will now be described. As described above, the current and voltage types of data signals that are time-divided and applied from signal line $X_1$ can be sequentially applied to data lines $D_1$, $D_2$ by using demultiplexer 401 including the analog switches.

Additional parasitic capacitance is generated by power cable 700' and data line $D_1$ in the case of the light emitting display device of FIG. 12, and additional parasitic capacitance is generated by power cable 700' and signal line $X_1$ in the case of the light emitting display device of FIG. 4. The two types of capacitance formed by power cable 700 are the same when the line widths of data line $D_1$ and signal line $X_1$ are the same.

In the case of 1:N demultiplexing, the widths of data lines $D_1$ to $D_n$ are formed to be narrower than those of signal lines $X_1$ to $X_{n/N}$, since the number of data lines $D_1$ to $D_n$ is N times greater than that of signal lines $X_1$ to $X_{n/N}$. In this case, the capacitance formed between data line $D_1$ and power cable 700 is less than the capacitance formed between signal line $X_1$ and power cable 700. Data drivers 500 in the light emitting display devices of FIGS. 4 and 12 drive the load formed by signal line $X_1$, analog switch S1 and data line $D_1$. Therefore, since the data programming time is reduced as the parasitic capacitance formed in data line $D_1$ or signal line $X_1$ becomes lesser in the case of programming the data to the pixel circuit through data line $D_1$ and signal line $X_1$, the arrangement of FIG. 12 provides faster data programming rates compared to the arrangement of FIG. 4.

The pixel circuit formed at the pixel area of the light emitting display devices according to the first and second exemplary embodiments will now be described with reference to FIG. 13. Since the analog switches described with reference to FIG. 7 transmit the voltage and current types of data signals, and the sample/hold circuits described in FIGS. 8 to 11 transmit the current-type data signals, a current programming pixel circuit will be exemplified in FIG. 13.

Figure 13:
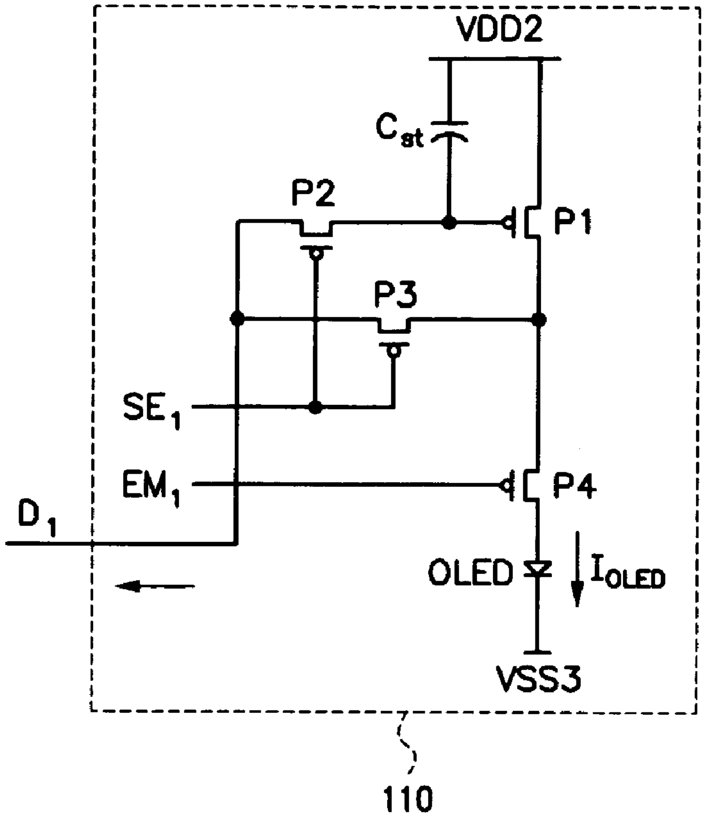
FIG. 13 shows a simplified circuit diagram of the pixel circuit formed at the pixel area of the light emitting display devices of FIGS. 4 and 12.

FIG. 13 shows a simplified circuit diagram of the pixel circuit formed at the pixel area of the light emitting display devices of FIGS. 4 and 12.

Referring to FIG. 13, pixel circuit 110 is coupled to the data line $D_1$ of FIGS. 4 and 12. Data are programmed to the pixel circuit 110 by the current transmitted from the data line $D_1$ and pixel circuit 110 uses electroluminescence of organic matter. Pixel circuit 110 includes four transistors P1, P2, P3, P4, capacitor Cst, and an organic light emitting device (OLED). Transistors P1, P2, P3, P4 include p channel FETs.

A source of transistor P1 is coupled to power supply voltage VDD2, and capacitor Cst is coupled between the source and a gate of transistor P1. Power supply voltage VDD2 is coupled to vertical line $V_1$. Transistor P2 coupled between data line $D_1$ and the gate of transistor P1 responds to a select signal provided from select scan line $SE_1$. Transistor P3 is coupled between a drain of transistor P1 and data line $D_1$, and diode-connects transistor P1 together with transistor P2 in response to the select signal provided from select scan line $SE_1$. Transistor P4 is coupled between the drain of transistor P1 and the OLED, and transmits the current provided from transistor P1 to the OLED in response to an emit signal provided from an emit scan line $EM_1$. A cathode of the OLED is coupled to power supply voltage VSS3 which is less than power supply voltage VDD2.

In this instance, when transistors P2, P3 are turned on because of the select signal provided from select scan line $SE_1$, the current provided from data line $D_1$ flows to the drain of transistor P1, and a source-gate voltage of transistor P1 corresponding to the current is stored in capacitor Cst. When the emit signal is applied from emit scan line $EM_1$, transistor P4 is turned on, current $I_{OLED}$ of transistor P1 corresponding to the current stored in capacitor Cst is supplied to the OLED, and the OLED emits light according to the current.

As described, the voltage dropping is reduced since power supply voltage VDD2 is supplied by vertical line $V_1$ and power cables 600, 700 for transmitting a voltage to vertical line $V_1$ are respectively formed on the top and bottom of the display area. Also, the demultiplexer samples the current-type data signals within a given time by appropriately establishing the width of power cable 700 as previously described in the case of using the sample/hold circuits.

Two types of select scan lines $SE_1$ to $SE_m$ and emit scan lines $EM_1$ to $EM_m$ have been used in the exemplary embodiments, but no emit scan lines $EM_1$ to $EM_m$ are needed when there is no need to control the light emitting time of the pixel circuit. In this case, the width Ws in Equations 4, 5, 7, 8, and 10 is given as the width of the select scan lines $SE_1$ to $SE_m$. Also, other scan lines may be required in addition to the select scan lines and the emit scan lines in order to control an operation of other switches in the pixel circuit, and in this case, the width Ws in Equations 4, 5, 7, 8, and 10 includes an influence caused by the additional scan lines.

The demultiplexer coupled to the sample/hold circuits has been described in the embodiments, and without being restricted to this, the present invention is applicable to a demultiplexer coupled to the sample/hold circuits in other ways, which will be described with reference to FIGS. 14 and 15.

Figure 14:
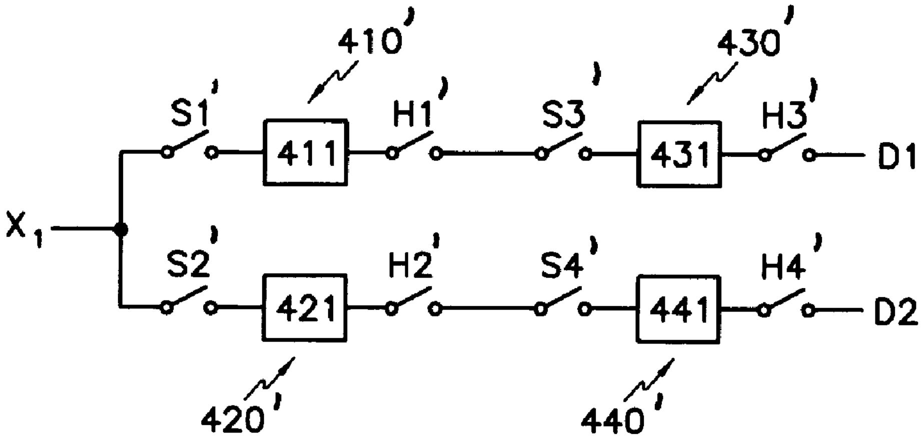
FIG. 14 shows a second demultiplexer formed by the sample/hold circuits.
Figure 15:
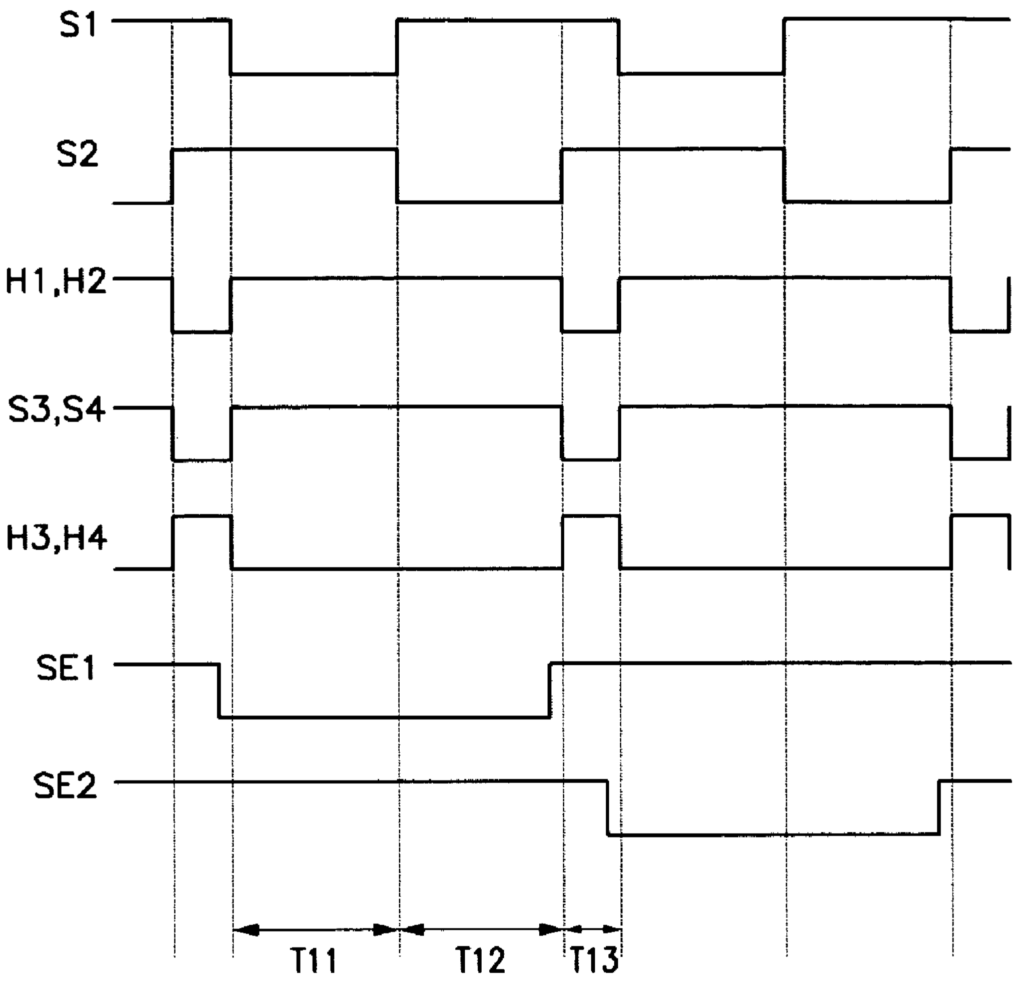
FIG. 15 shows a drive timing diagram of the second demultiplexer of FIG. 14.

FIG. 14 shows a second demultiplexer formed by the sample/hold circuits, and FIG. 15 shows a drive timing diagram of the second demultiplexer of FIG. 15.

For example, sample/hold circuits 410', 430' are coupled in series and sample/hold circuits 420', 440' are coupled in series in a 1:2 demultiplexer, as shown in FIG. 14. Referring to FIG. 15, sample/hold circuit 410' samples the current applied through signal line $X_1$, and sample/hold circuits 430', 440' hold the current through data lines $D_1$, $D_2$ during interval T11. Sample/hold circuit 420' samples the current applied through signal line $X_1$, sample/hold circuits 430', 440' hold the current through data lines $D_1$, $D_2$ during interval T12. Sample/hold circuits 410', 420' hold the current, and sample/hold circuits 430', 440' sample the held current and store data during interval T13. Intervals T11, T12, T13 respectively correspond to one horizontal period, and they are repeated to perform the demultiplexing operation.

According to the present invention, the voltage dropping in the vertical line arranged in the vertical direction is reduced by additionally providing a power cable for supplying the power supply voltage in the light emitting display device using the demultiplexer, and the substantially uniform brightness is obtained irrespective of the position of the pixels since the voltage dropping is reduced. Further, the voltage dropping generated in the power cable and the vertical lines is reduced by adding power supply points, and power consumption is reduced since there is no need to increase the power supply voltage in order to obtain the corresponding operational points.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A light emitting display device comprising:

a substrate comprising a display area and a peripheral area external to the display area;

a plurality of data lines in the display area for transmitting data signals for displaying images;

a plurality of pixel circuits in the display area and coupled to the data lines;

a plurality of pixel power lines in a first direction in the display area, for supplying a power supply voltage to the pixel circuits;

a plurality of first signal lines in the peripheral area;

a data driver coupled to the first signal lines for time-dividing first signals corresponding to the data signals and for transmitting time-divided first signals to the first signal lines;

a demultiplex unit, including a plurality of demultiplexers in the peripheral area for respectively receiving the time-divided first signals from the first signal lines;

a first power cable in a second direction crossing the first direction in the peripheral area and coupled to first terminals of the pixel power lines; and a second power cable in the second direction in the peripheral area and coupled to second terminals of the pixel power lines, wherein each demultiplexer receives a time-divided first signal from the first signal line and transmits the data signals to at least two data lines.

2. The light emitting display device of claim 1, wherein the first power cable is insulated from the first signal line, and is between the data driver and the demultiplex unit.

3. The light emitting display device of claim 1, wherein the first power cable is insulated from the data lines extended to the peripheral area, and is between the demultiplex unit and the display area.

4. The light emitting display device of claim 1, wherein the data driver is in the peripheral area.

5. The light emitting display device of claim 2, wherein the demultiplexer includes a first switch coupled between a first data line from among the at least two data lines and the first signal line, and a second switch between a second data line from among the at least two data lines and the first signal line.

6. The light emitting display device of claim 2, wherein the first signal and the data signal are in a current format, the demultiplexer includes a plurality of sample/hold circuits, and at least two sample/hold circuits from among the sample/hold circuits sample current applied through input terminals and respectively output current corresponding to sampled current to at least two data lines through output terminals.

7. The light emitting display device of claim 6, wherein the relationship:

$$C2 < \frac{C1}{N}$$

where C1 is parasitic capacitance in one data line, C2 is parasitic capacitance between the first signal line and the first power cable, N is the number of data lines corresponding to one first signal line, is satisfied.

8. The light emitting display device of claim 6, further comprising a plurality of second signal lines being insulated from the data lines and crossing the data lines in the display area, wherein the relationship:

$$Wv < \frac{Ws \times Wd}{N \times Wx}$$

where Wv is the width of the first power cable, N is the number of data lines corresponding to one first signal line, Wd is the width of a data line, Wx is the width of the first signal line, and Ws is the summation of the widths of the second signal lines, is satisfied.

9. The light emitting display device of claim 3, wherein the demultiplexer includes a plurality of sample/hold circuits, and at least two sample/hold circuits from among the sample/hold circuits sample the current through input terminals and respectively output current corresponding to sampled current to the at least two data lines through output terminals.

10. The light emitting display device of claim 9, wherein the relationship:

$$C3 < \frac{C1}{N-1}$$

where C1 is parasitic capacitance in one data line, C3 is parasitic capacitance between the data line and the first power cable, and N is the number of data lines corresponding to one first signal line, is satisfied.

11. The light emitting display device of claim 9, further comprising a plurality of second signal lines insulated from the data lines and crossing the data lines in the display area, wherein the relationship:

$$Wv < \frac{Ws}{N-1}$$

where Wv is a width of the first power cable, N is the number of data lines corresponding to one first signal line, and Ws is a summation of the widths of the second signal lines, is satisfied.

12. The light emitting display device of claim 9, further comprising a plurality of second signal lines insulated from the data lines and crossing the data lines in the display area, wherein the relationship:

$$Wv > \frac{m \times Ws \times Wd}{N \times Wx - Wd}$$

where Wv is a width of the first power cable, N is the number of data lines corresponding to one first signal line, Wd is a width of a data line, Wx is a width of the first signal line, and Ws is a summation of the widths of the second signal lines, is satisfied.

13. The light emitting display device of claim 6, wherein the demultiplexer includes:

a first sample/hold circuit and a second sample/hold circuit, each of the first sample/hold circuit and a second sample/hold circuit having a input terminal coupled to the first signal line and an output terminal coupled to a first data line from among at least two data lines; and a third sample/hold circuit and a fourth sample/hold circuit, each of the third sample/hold circuit and a fourth sample/hold circuit having an input terminal coupled to the first signal line, and an output terminal coupled to a second data line from among at least two data lines.

14. The light emitting display device of claim 6, wherein the demultiplexer includes:

a first sample/hold circuit having an input terminal coupled to the first signal line;

a second sample/hold circuit having an input terminal coupled to an output terminal of the first sample/hold circuit, and an output terminal coupled to a first data line from among at least two data lines;

a third sample/hold circuit having an input terminal coupled to the first signal line; and a fourth sample/hold circuit having an input terminal coupled to an output terminal of the third sample/hold circuit, and an output terminal coupled to a second data line from among at least two data lines.

15. The light emitting display device of claim 6, wherein the pixel includes:

a transistor for flowing the current-type data signal transmitted through the data line;

a capacitor, coupled between a source and a gate of the transistor, for storing a voltage corresponding to the current flowing to the transistor; and a light emitting device for emitting light corresponding to current flowing to the transistor according to the voltage stored in the capacitor.

16. The light emitting display device of claim 6, wherein the light emitting device uses electroluminescence of organic matter.

17. The light emitting display device of claim 1, further comprising:

a first power supply cable and a second power supply cable coupled to both ends of the first power cable for transmitting the power supply voltage; and a third power supply cable and a fourth power supply cable coupled to both ends of the second power cable for transmitting the power supply voltage.

18. A light emitting display device comprising:

a substrate including a display area and a peripheral area external to the display area;

a plurality of data lines formed in the display area for transmitting data signals for displaying images;

a plurality of pixel circuits in the display area and coupled to the data lines;

a plurality of pixel power lines in the display area for supplying a power supply voltage to the pixel circuits;

a demultiplex unit including a plurality of demultiplexers in the peripheral area respectively coupled to at least two data lines from among the data lines;

a first power cable between the demultiplex unit and the display area, insulated from the data lines extended to the peripheral area, crossing the data lines, and transmitting the power supply voltage to a first end of the pixel power line; and a driver coupled to the demultiplex unit for time-dividing a first signal corresponding to a data signal and for transmitting a time-divided signal to the demultiplexer, wherein the demultiplexer receives the time-divided signal from the data driver and transmits the data signal to at least two data lines.

19. The light emitting display device of claim 18, wherein the demultiplex unit sequentially transmits the time-divided first signal to the at least two data lines.

20. The light emitting display device of claim 18, wherein the data signal and the first signal are current-type signals, and the demultiplex unit sequentially samples the first signal sequentially applied during one horizontal period, and concurrently applies a sampled signal to the at least two data lines during a subsequent horizontal period.

21. The light emitting display device of claim 18, wherein parasitic capacitance between the first power cable and the one data line is greater than a value obtained by dividing parasitic capacitance in one data line by a difference between 1 and the number of the data lines corresponding to one demultiplexer.

22. The light emitting display device of claim 18, further comprising a plurality of second signal lines insulated from the data lines and crossing the data lines in the display area, wherein a width of the first power cable is greater than a value obtained by dividing a summation of widths of the first signal lines by a difference between 1 and the number of data lines corresponding to the demultiplexer.

23. The light emitting display device of claim 18, further comprising a plurality of second signal lines insulated from and crossing the data lines in the display area, and a plurality of first signal lines coupled between the data driver and the demultiplexers, wherein a width of the first power cable is greater than a value obtained by dividing a product of the summation of the width of a single data line and widths of the first signal lines by a difference between 1 and a product of the number of data lines corresponding to the second signal lines and widths of the second signal lines.

24. The light emitting display device of claim 18, further comprising a second power cable substantially in parallel to the first power cable in the peripheral area for transmitting the power supply voltage to a second end of the pixel power line, wherein the power supply voltage is externally supplied to both ends of the first power cable and both ends of the second power cable respectively.

25. A light emitting display device comprising:

a substrate including a display area and a peripheral area external to the display area;

a plurality of data lines in the display area for transmitting data signals for displaying images;

a plurality of pixel circuits in the display area and coupled to the data lines;

a plurality of pixel power lines in the display area for supplying a power supply voltage to the pixel circuits;

a demultiplex unit including a plurality of demultiplexers in the peripheral area, and respectively coupled to at least two data lines from among the data lines;

a plurality of first signal lines in the peripheral area coupled to the demultiplexers;

a data driver coupled to the first signal lines for time-dividing a first signal corresponding to the data signal and for transmitting the time-divided signal to the first signal lines; and a first power cable insulated from the second signal lines and crossing the first signal lines between the demultiplex unit and the data driver for transmitting the power supply voltage to the first end of the pixel power line, wherein the demultiplexer receives a time-divided signal from the data driver through the first signal line and transmits a data signal to at least two data lines.

26. The light emitting display device of claim 25, wherein the data signal and the first signal are current-type signals, and the demultiplex unit for sequentially sampling the first signal sequentially applied during one horizontal period and for concurrently applying the sampled signal to the at least two data lines during a subsequent horizontal period.

27. The light emitting display device of claim 26, wherein parasitic capacitance between the first signal line and the first power cable is less than a value obtained by dividing parasitic capacitance at a data line by the number of data lines corresponding to a first signal line.

28. The light emitting display device of claim 26, further comprising a plurality of second signal lines insulated from the data lines and crossing the data lines in the display area, wherein a width of the first power cable is less than a value obtained by dividing a product of the width of a data line and a summation of widths of the second signal lines by a product of the number of data lines corresponding to a first signal line and the width of the first signal lines.

29. The light emitting display device of claim 26, further comprising a second power cable substantially in parallel to the first power cable in the peripheral area for transmitting the power supply voltage to second ends of the pixel power lines, wherein the power supply voltage is externally supplied to both ends of the first power cable and both ends of the second power cable respectively.

* * * * *

UNITED STATES PATENT AND TRADEMARK OFFICE

CERTIFICATE OF CORRECTION

PATENT NO. : 7,502,019 B2
APPLICATION NO. : 10/987410
DATED : March 10, 2009
INVENTOR(S) : Dong-Yong Shin et al.

It is certified that error appears in the above-identified patent and that said Letters Patent is hereby corrected as shown below:

In the Claims

| | |
|---|---|
| Column 19, line 45, Claim 13, | Delete “a” Insert -- an -- |
| Column 20, line 25, Claim 18, | Delete “formed” |

Signed and Sealed this
Eighth Day of February, 2011

David J. Kappos
*Director of the United States Patent and Trademark Office*